(12) United States Patent
Kossev et al.

(10) Patent No.: US 12,194,952 B2
(45) Date of Patent: Jan. 14, 2025

(54) DYNAMIC GUIDE PROVIDING UPPER ANCHORAGE FOR A VEHICLE SEATBELT

(71) Applicant: Atieva, Inc., Newark, CA (US)

(72) Inventors: Andrey Ivov Kossev, Newark, CA (US); Alan Del Toro, Newark, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/328,493

(22) Filed: Jun. 2, 2023

(65) Prior Publication Data

US 2024/0246508 A1 Jul. 25, 2024

Related U.S. Application Data (60) Provisional application No. 63/481,551, filed on Jan. 25, 2023.

(51) Int. Cl.
| | | |
|---|---|---|
| *B60R 22/24* | (2006.01) | |
| *B60R 22/26* | (2006.01) | |
| *B60R 22/18* | (2006.01) | |
| *B60R 22/34* | (2006.01) | |

(52) U.S. Cl.
CPC ............. *B60R 22/24* (2013.01); *B60R 22/26* (2013.01); *B60R 2022/1818* (2013.01); *B60R 22/34* (2013.01)

(58) Field of Classification Search
CPC ............ B60R 22/24; B60R 2022/3402; B60R 2022/1843
See application file for complete search history.

(56) References Cited

U.S. PATENT DOCUMENTS

| | | | | |
|---|---|---|---|---|
| 11,097,686 B1 * | 8/2021 | Aldeborg | ................ | B60R 22/20 |
| 11,724,665 B1 * | 8/2023 | Jaradi | ..................... | B60R 22/24 |
| | | | | 280/805 |
| 2003/0020272 A1 | 1/2003 | Yoshino et al. | | |
| 2018/0015904 A1 * | 1/2018 | Loew | ..................... | B60R 22/26 |
| 2019/0111875 A1 * | 4/2019 | Jaradi | ..................... | B60R 22/26 |

(Continued)

FOREIGN PATENT DOCUMENTS

| | | | |
|---|---|---|---|
| EP | 0532378 A1 | | 3/1993 |
| JP | H0679416 U | * | 11/1994 |

(Continued)

OTHER PUBLICATIONS

International Search Report and Written Opinion for PCT Application No. PCT/US2024/012795, mailed on May 3, 2024, 18 pages.

*Primary Examiner* — Nicole T Verley
(74) *Attorney, Agent, or Firm* — Brake Hughes Bellermann LLP (57) ABSTRACT

A seatbelt system for an occupant of a vehicle comprises: an anchor point attached to a body of the vehicle; seatbelt webbing extending from the anchor point toward the occupant; and a dynamic guide for the seatbelt webbing positioned between the anchor point and a shoulder of the occupant, the dynamic guide comprising a lid attached to a base, the seatbelt webbing extending through the dynamic guide and exiting through an opening between the lid and the base, the dynamic guide configured so that the lid at least partially separates from the base at a first predetermined tension in the seatbelt webbing laterally in the vehicle.

15 Claims, 10 Drawing Sheets

(56) References Cited

U.S. PATENT DOCUMENTS

2019/0270427 A1* 9/2019 Sadakhom .......... B60R 13/0884
2019/0315310 A1* 10/2019 Jaradi .................... B60R 22/24
2021/0061219 A1    3/2021 Inoue

FOREIGN PATENT DOCUMENTS

| JP | 10001023 A | * | 1/1998 |
| JP | H101023 A | * | 1/1998 |
| JP | 2010111294 A | * | 5/2010 |
| JP | 2010179676 A | * | 8/2010 |
| JP | 3168029 U | * | 5/2011 |
| JP | 2012116206 A | * | 6/2012 |
| JP | 2013001291 A | * | 1/2013 |
| JP | 2016030496 A | * | 3/2016 |
| JP | 2016030497 A | * | 3/2016 |
| JP | 2016030498 A | * | 3/2016 |
| JP | 2016030499 A | * | 3/2016 |
| JP | 2016043888 A | * | 4/2016 |
| JP | 6240577 B2 | * | 11/2017 |
| JP | 6259732 B2 | * | 1/2018 |
| JP | 6371621 B2 | * | 8/2018 |
| JP | 6371622 B2 | * | 8/2018 |

* cited by examiner

DYNAMIC GUIDE PROVIDING UPPER ANCHORAGE FOR A VEHICLE SEATBELT

CROSS-REFERENCE TO RELATED APPLICATION

This application claims benefit, under 35 U.S.C. § 119, of U.S. Provisional Patent Application No. 63/481,551, filed on Jan. 25, 2023, entitled "DYNAMIC GUIDE PROVIDING UPPER ANCHORAGE FOR A VEHICLE SEATBELT", the disclosure of which is incorporated by reference herein in its entirety.

TECHNICAL FIELD

This document relates to a dynamic guide providing an upper anchorage for a vehicle seatbelt.

BACKGROUND

Seatbelts are mandatory in many vehicles. A three-point belt typically has a shoulder belt extending from a point behind one of the occupant's shoulders, across their torso, and down to a buckle near the occupant's hip, where a lap belt traversing the pelvis also attaches.

SUMMARY

In a first aspect, a seatbelt system for an occupant of a vehicle comprises: an anchor point attached to a body of the vehicle; seatbelt webbing extending from the anchor point toward the occupant; and a dynamic guide for the seatbelt webbing positioned between the anchor point and a shoulder of the occupant, the dynamic guide comprising a lid attached to a base, the seatbelt webbing extending through the dynamic guide and exiting through an opening between the lid and the base, the dynamic guide configured so that the lid at least partially separates from the base at a first predetermined tension in the seatbelt webbing laterally in the vehicle.

Implementations can include any or all of the following features. The seatbelt webbing is fixed to the body of the vehicle at the anchor point. The seatbelt system further comprises a seatbelt retractor attached to the body of the vehicle, wherein the seatbelt webbing is attached to the seatbelt retractor, and wherein the anchor point is positioned between the seatbelt retractor and the dynamic guide. The anchor point is substantially horizontally level with the dynamic guide or higher than the dynamic guide. The first predetermined tension is lower than a second predetermined tension corresponding to a load limit tension of the seatbelt retractor. The first predetermined tension is higher than a third predetermined tension corresponding to occupant movement. The dynamic guide is attached to an interior wall of a passenger compartment of the vehicle. The dynamic guide is attached to a seatback of a seat of the occupant. The seatbelt system is installed for a second-row seat, or a subsequent-row seat, of the vehicle. The dynamic guide has a snap feature holding the lid and the base together in a closed position, the snap feature comprising a hook on one of the lid or the base, the hook configured for engaging with a detent on the other of the lid or the base. The dynamic guide has a disengagement mechanism for releasing the lid from the base at the first predetermined tension in the seatbelt webbing. The disengagement mechanism is configured to rupture at the first predetermined tension in the seatbelt webbing. The disengagement mechanism comprises an initiator to cause the disengagement mechanism to rupture at the first predetermined tension. The dynamic guide has a snap feature holding the lid and the base together in a closed position, the snap feature comprising a hook on one of the lid or the base, the hook configured for engaging with a detent on the other of the lid or the base, and wherein the initiator comprises a notch in the hook. The dynamic guide has a first snap feature holding the lid and the base together in a closed position, the first snap feature comprising a hook on one of the lid or the base and a detent on the other of the lid or the base, and wherein the disengagement mechanism is configured to disengage the hook from the detent at the first predetermined tension in the seatbelt webbing. The disengagement mechanism comprises a release extending from the hook, the release configured so that tension in the seatbelt webbing causes the seatbelt webbing to apply pressure on the release. The seatbelt system further comprises a second snap feature holding the lid and the base together in the closed position, the first and second snap features positioned between the anchor point and the opening through which the seatbelt webbing exits.

In a second aspect, a seatbelt system for an occupant of a vehicle, the seatbelt system comprising: an anchor point attached to a body of the vehicle; a seatbelt retractor attached to the body of the vehicle; seatbelt webbing attached to the seatbelt retractor, the seatbelt webbing extending from the anchor point toward the occupant; and means for dynamically guiding the seatbelt webbing, positioned between the anchor point and a shoulder of the occupant, the means releasing the seatbelt webbing at a first predetermined tension in the seatbelt webbing, the first predetermined tension lower than a second predetermined tension corresponding to a load limit tension of the seatbelt retractor, and higher than a third predetermined tension corresponding to occupant movement.

BRIEF DESCRIPTION OF DRAWINGS

Like reference symbols in the various drawings indicate like elements.

DETAILED DESCRIPTION

This document describes examples of systems and techniques of a dynamic guide providing an upper anchorage for a vehicle seatbelt.

In existing vehicle seatbelts, anchor points are provided that hold the seatbelt in place. However, they do not provide dynamic guidance of the seatbelt as described herein. Anchor points, and seatbelts in general, may be subject to one or more safety regulations in the region or country where the vehicle is sold. Examples of such regulations include UN R14 and one or more FMVSS specifications. As such, an anchorage providing dynamic guidance according to the present disclosure can be compliant with (e.g., positioned according to one or more zones specified by) the regulation(s). For example, the dynamic guidance can be provided so that a feature disengages with the seatbelt webbing at the correct amount of load.

Examples described herein refer to a vehicle. A vehicle is a machine that transports passengers or cargo, or both. A vehicle can have one or more electric motors. Examples of vehicles include, but are not limited to, cars, trucks, buses, motorcycles, and scooters. The number of wheels can differ between types of vehicles, and one or more (e.g., all) of the wheels can be used for propulsion of the vehicle. The vehicle can include a passenger compartment accommodating one or more persons. A vehicle can be powered exclusively by electricity, or can use one or more other energy source in addition to electricity, or can have an internal combustion engine (ICE), to name just a few examples.

Figure 1A:
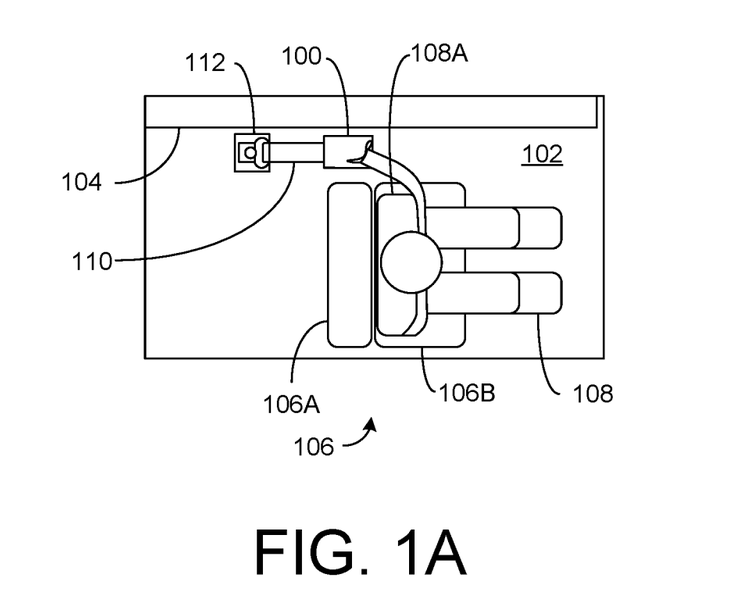
FIGS. 1A-1B show examples of a dynamic guide providing an upper anchorage for a vehicle seatbelt, pictured in a comfort condition, or a condition of frontal impact.
Figure 1B:
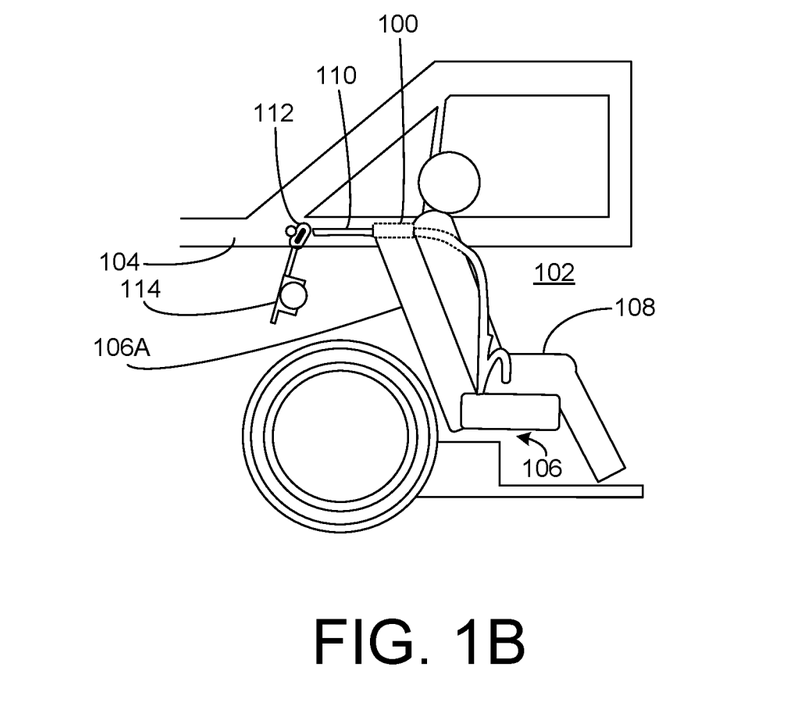

FIGS. 1A-1B show examples of a dynamic guide 100 providing an upper anchorage for a vehicle seatbelt, pictured in a comfort condition, or a condition of frontal impact. The dynamic guide 100 can be used with one or more other examples described elsewhere herein. Referring initially to FIG. 1A, the dynamic guide 100 is used within a vehicle that is here only partially shown for simplicity. A portion of a passenger compartment 102 is shown from above. The passenger compartment 102 is partially defined by an interior wall 104. The interior wall 104 can be part of the body of the vehicle. The interior wall 104 can be partially or fully covered by interior trim or other material. A seat 106 can be provided for an occupant 108. For example, the seat 106 includes a seatback 106A and a seat cushion 106B. The seat 106 can be a second-row seat, a third-row seat, or another subsequent-row seat, of the vehicle.

The vehicle can include one or more seatbelt systems. Here, a seatbelt webbing 110 is installed in the passenger compartment to restrain the occupant 108. The seatbelt webbing 110 passes through the dynamic guide 100 and extends through an opening in the dynamic guide 100. The seatbelt webbing 110 can extend at least from an anchor point 112 toward the occupant 108. For example, the seatbelt webbing 110 can be part of a three-point belt for the occupant 108. The anchor point 112 can be attached to the body of the vehicle (e.g., to the interior wall 104). The seatbelt webbing 110 can be fixed to the vehicle body at the anchor point 112, or can extend beyond the anchor point 112 and be fixed to another component (e.g., at a seatbelt retractor). For example, the anchor point 112 can be a D-ring through which the seatbelt webbing 110 extends.

The seatbelt system includes the dynamic guide 100 that is positioned between the anchor point 112 and a shoulder 108A of the occupant. In some implementations, the dynamic guide 100 is attached to the interior wall 104 of the passenger compartment. The dynamic guide 100 is positioned forward in the vehicle of the anchor point 112. In some implementations, the anchor point 112 is positioned substantially horizontally level with the dynamic guide 100, or higher than the dynamic guide 100.

With reference to FIG. 1B, the anchor point 112 is shown attached to the interior wall 104. The anchor point 112 can be mounted at any of multiple spatial orientations relative to the interior wall 104 and/or the seat 106, as indicated by the examples in this illustrations. The dynamic guide 100 can be designed and/or installed so as to accommodate multiple different locations and/or configurations of the seat 106, as indicated by the examples in this illustrations.

The seatbelt system includes a seatbelt retractor 114 attached to the body of the vehicle. For example, the seatbelt retractor 114 is attached to the interior wall 104, to the seat 106, and/or to a floor of the passenger compartment. The seatbelt webbing 110 is attached to the seatbelt retractor 114. The anchor point 112 is positioned between the seatbelt retractor 114 and the dynamic guide 100.

The situation in FIGS. 1A-1B illustrates a condition before the dynamic guide 100 is actuated by seatbelt tension. For example, this may be characterized as a normal condition (e.g., during ordinary driving of the vehicle). As another example, this condition can also exist during and after a frontal collision with the vehicle. The dynamic guide 100 can be configured and installed so that it does not, or is substantially unlikely to, be actuated in the event of a frontal collision. Rather, in the frontal collision the dynamic guide 100 can guide the seatbelt webbing without becoming actuated, in which case the seatbelt webbing 110 continues to extend through the dynamic guide 100, and exit through the opening in the dynamic guide 100, both before and after the frontal collision. As such, the dynamic guide 100 can remain structural and stay engaged in the frontal collision.

Figure 2A:
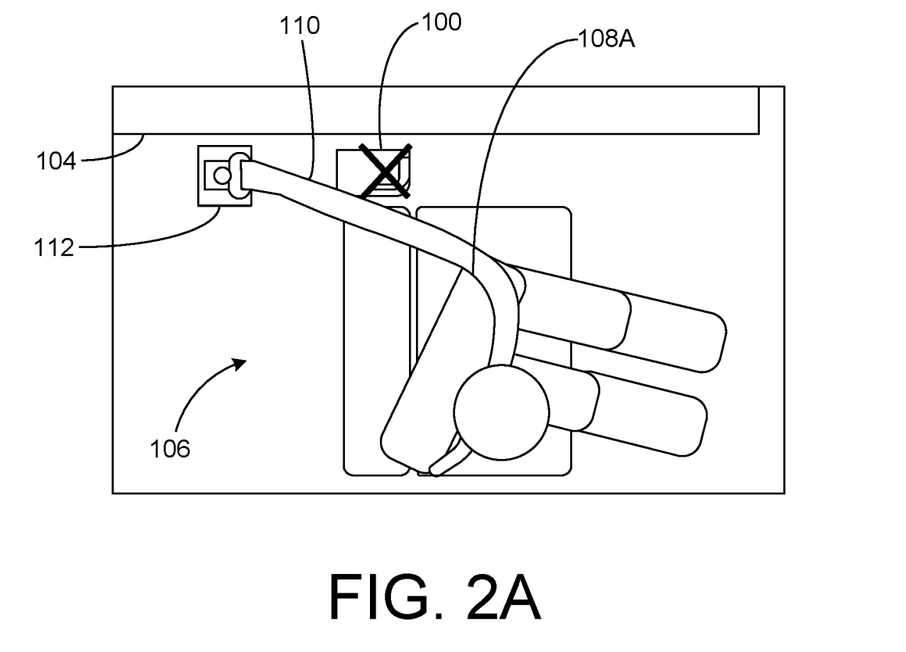
FIGS. 2A-2B show examples of the dynamic guide of FIGS. 1A-1B, pictured in a lateral/oblique impact condition.
Figure 2B:
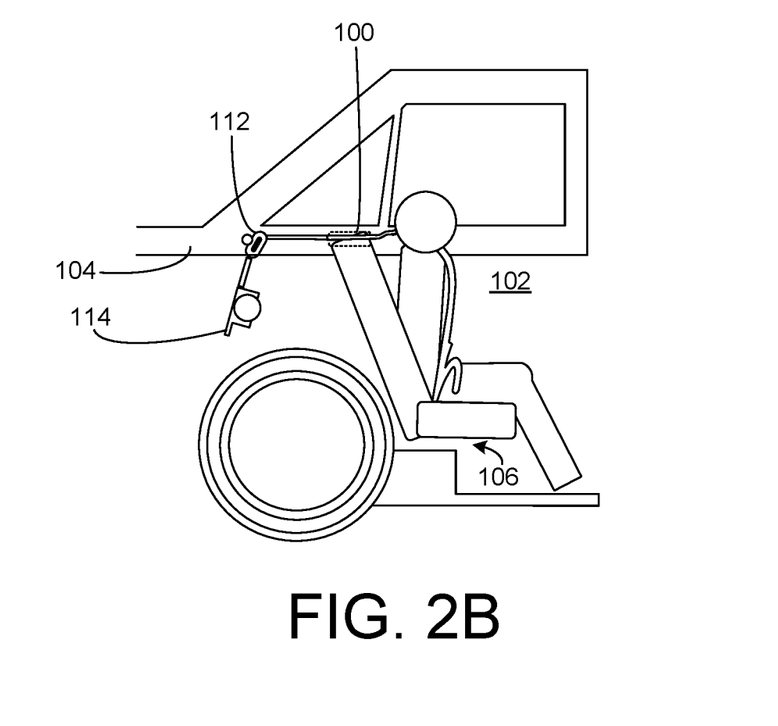

FIGS. 2A-2B show examples of the dynamic guide 100 of FIGS. 1A-1B, pictured in a lateral/oblique impact condition. That is, the depicted vehicle has undergone a collision that involved lateral impact and/or oblique impact, and the seatbelt system has restrained the occupant 108 to the seat 106. For example, the impact may have occurred to an outside of the interior wall 104, or at an opposing side of the vehicle. Particularly, the dynamic guide 100 has become actuated as a result of the collision and the seatbelt webbing 110 is not currently constrained by the dynamic guide 100. That is, the seatbelt webbing 110 no longer extends through the dynamic guide 100 or exits through any opening thereof. On the contrary, the seatbelt webbing 110 currently extends in a substantially linear direction between the anchor point 112 and the shoulder 108A of the occupant 108, the occupant 108 having been moved laterally compared to the examples in FIGS. 1A-1B. As such, the dynamic guide 100 can dynamically guide the seatbelt webbing 110 and can release the seatbelt webbing 110 in the situation exemplified in FIGS. 2A-2B.

The dynamic guidance can provide advantages over a fixed guide. For example, in the comfort condition the dynamic guide 100 can place the seatbelt webbing 110 in a correct and comfortable position relative to the occupant 108 such that in the frontal impact situation, the seatbelt system can provide proper constraint. In the lateral/oblique impact condition, moreover, the dynamic guide 100 can eliminate or reduce the possibility of the seatbelt webbing 110 falling off the shoulder 108A of the occupant 108 that may sometimes occur with fixed redirection. The dynamic guidance can allow the seatbelt webbing 110 to instead extend substantially linearly between the anchor point 112 and the occupant's shoulder.

The dynamic guide 100 can be designed to be actuated at a predetermined tension in the seatbelt webbing 110 laterally in the vehicle (e.g., in a direction away from the interior wall 104). The predetermined tension of actuation can be lower than a load limit tension of the seatbelt retractor 114. That is, the dynamic guide 100 can release the seatbelt webbing 110 at a predetermined tension that is lower than the predetermined tension that is the load limit of the seatbelt retractor 114 (i.e., where the seatbelt retractor 114 reduces the load on the occupant when significant load occurs). For example, the predetermined tension that actuates the dynamic guide 100 can be lower than and close to (e.g., within a few percent of) the load limit. The dynamic guide 100 can bring the seatbelt webbing 110 forward (in the comfort position) for all types of occupants in the seat 106 and close to their shoulders, while also facilitating that the seatbelt webbing 110 can move further inboard and remain on the shoulder in the lateral/oblique impact condition. The predetermined tension that is lower than the load limit can also be higher than a durability load case associated with normal (i.e., non-collision) operation. Occupant movement that occurs voluntarily (e.g., by turning sideways in the seat, or due to lateral acceleration during aggressive driving) should not actuate the dynamic guide 100. As such, the predetermined tension can be higher than a predetermined tension corresponding to occupant movement.

Figure 3:
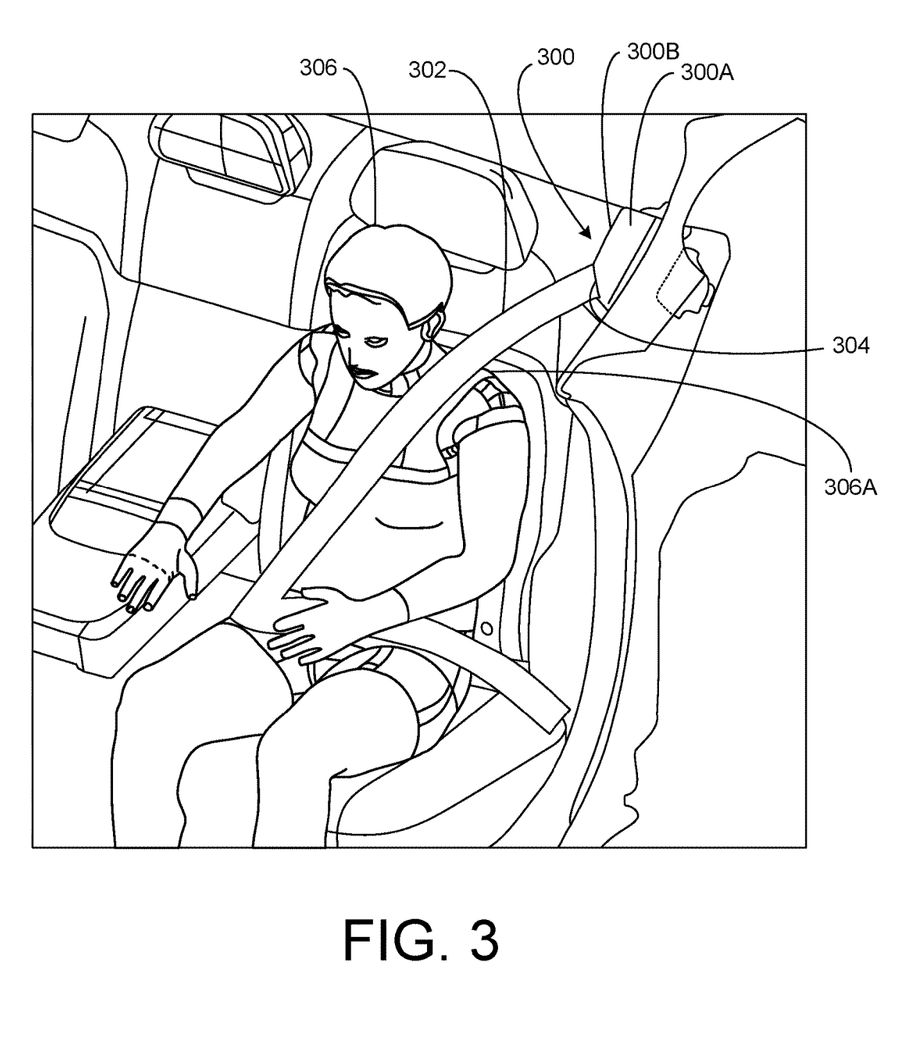
FIG. 3 shows an example of a dynamic guide providing an upper anchorage for a vehicle seatbelt, pictured in a comfort condition.

FIG. 3 shows an example of a dynamic guide 300 providing an upper anchorage for a vehicle seatbelt, pictured in a comfort condition. The dynamic guide 300 can be used with one or more other examples described elsewhere herein. The dynamic guide 300 can be mounted to the body of the vehicle. The vehicle seatbelt includes a webbing 302 that extends through the dynamic guide 300 and exits through an opening 304 of the dynamic guide 300. The dynamic guide 300 can have a clamshell design including at least a lid 300A that fits against a base 300B so as to form the opening 304. The lid 300A and the base 300B can at least partially disengage from each other upon a predetermined load in a y-direction of a vehicle coordinate system. As such, the dynamic guide 300 can dynamically guide the webbing 302 with regard to an occupant 306. For example, the dynamic guide 300 can prevent or reduce the possibility of the webbing 302 falling off a shoulder 306A of the occupant 306 during lateral impact of the vehicle.

Figure 4:
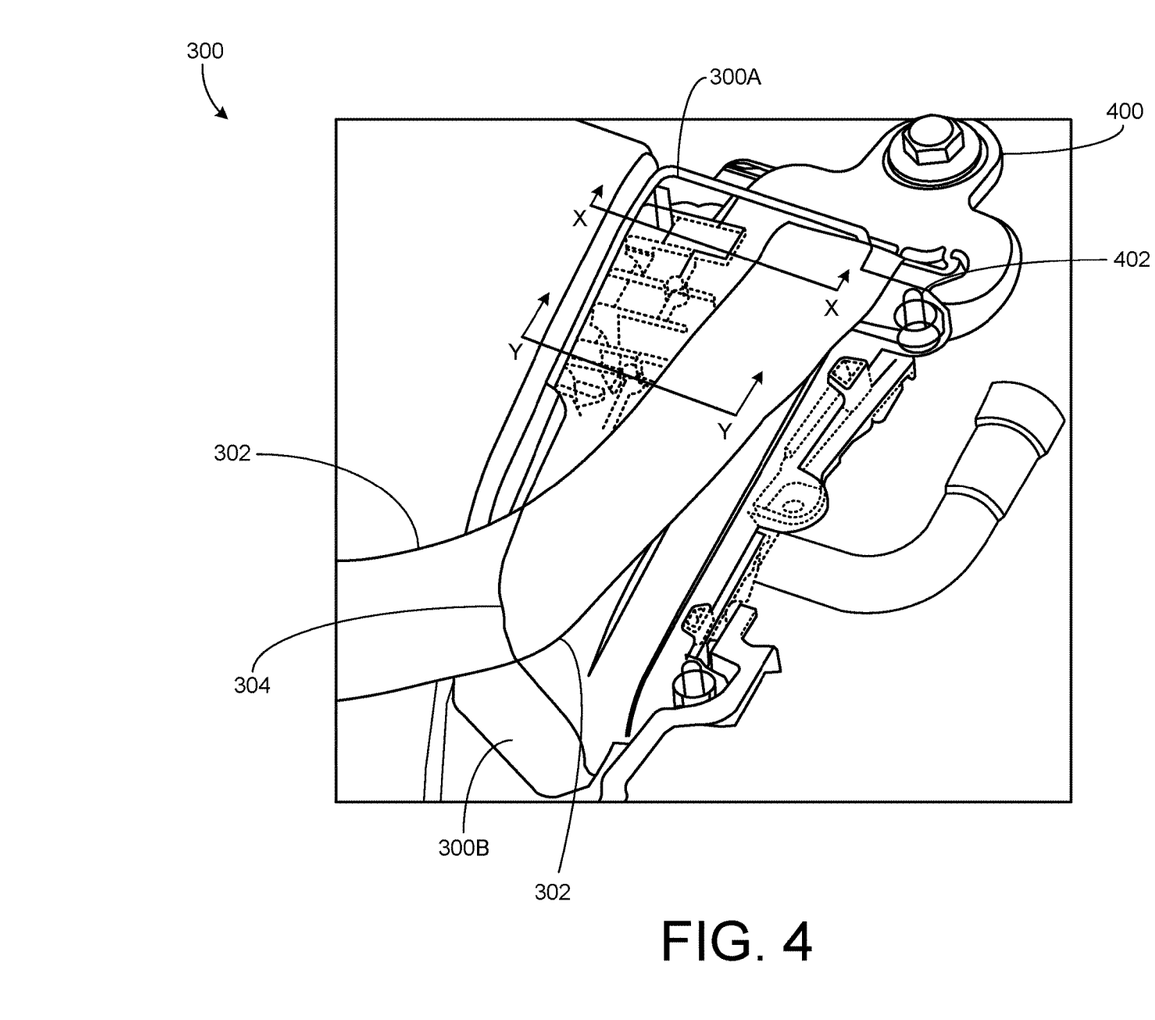
FIG. 4 shows an example of the dynamic guide of FIG. 3.

FIG. 4 shows an example of the dynamic guide 300 of FIG. 3. The lid 300A is here shown partially transparent. As such, the webbing 302 that extends through the dynamic guide 300 and exits through the opening 304 is here visible both inside and outside the dynamic guide 300. An anchor point 400 can attach the dynamic guide 300 to the vehicle body, for example by way of one or more pins 402. For example, the anchor point 400 can be a D-ring through which the webbing 302 runs.

Figure 5:
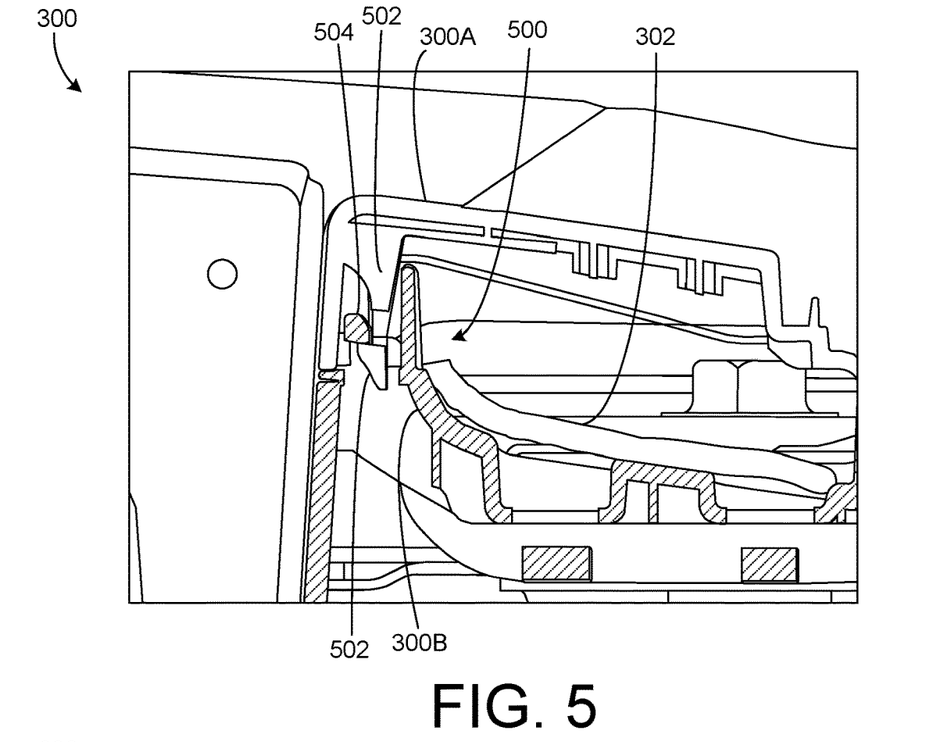
FIG. 5 shows an example of a cross section of the dynamic guide taken along line x-x in FIG. 4, wherein the dynamic guide has a snap feature.

FIG. 5 shows an example of a cross section of the dynamic guide taken along line x-x in FIG. 4, wherein the dynamic guide has a snap feature 500. The snap feature 500 can be used with one or more other examples described elsewhere herein. The lid 300A and the base 300B are here shown in a closed position, where the snap feature 500 holds them together in a closed position so as to enclose the webbing 302. One of the lid 300A or the base 300B can have a hook 502. Another one of the lid 300A or the base 300B can have a detent 504 that is aligned with the hook 502. Here, the hook 502 is on the lid 300A and the detent 504 is on the base 300B. The hook 502 can engage with the detent 504 to hold the lid 300A against the base 300B.

Figure 6:
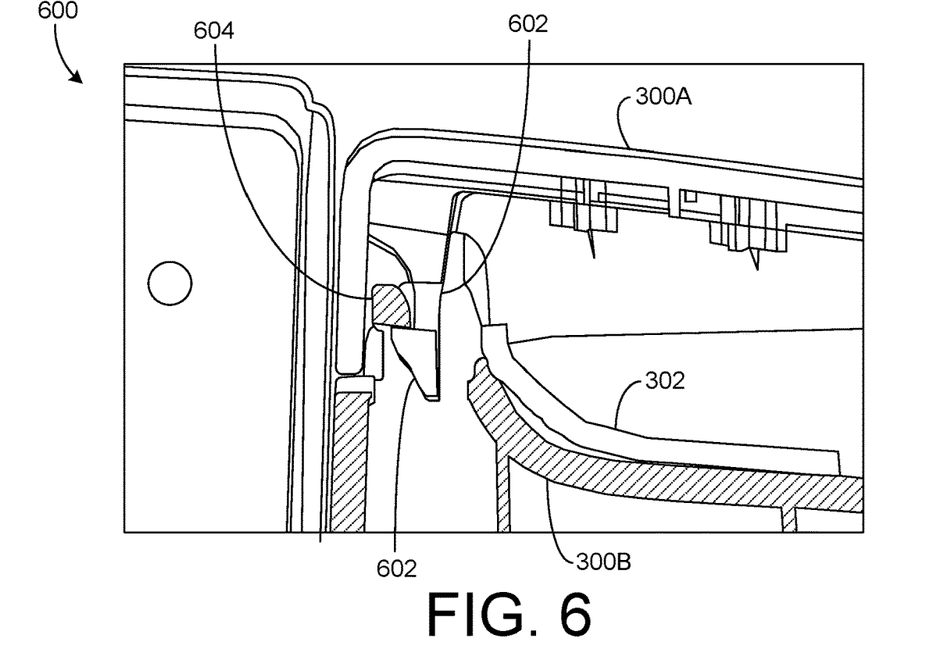
FIG. 6 shows an example of a cross section of the dynamic guide taken along line y-y in FIG. 4, wherein the dynamic guide has a snap feature.

FIG. 6 shows an example of a cross section of the dynamic guide taken along line y-y in FIG. 4, wherein the dynamic guide has a snap feature 600. The snap feature 600 can be used with one or more other examples described elsewhere herein. The lid 300A and the base 300B are here shown in a closed position, where the snap feature 600 holds them to each other so as to enclose the webbing 302. One of the lid 300A or the base 300B can have a hook 602. Another one of the lid 300A or the base 300B can have a detent 604 that is aligned with the hook 602. Here, the hook 602 is on the lid 300A and the detent 604 is on the base 300B. The hook 602 can engage with the detent 604 to hold the lid 300A against the base 300B. The snap features 500 and 600 can be positioned between the anchor point (e.g., the anchor point 400) and the opening 304 through which the seatbelt webbing exits.

Figure 7:
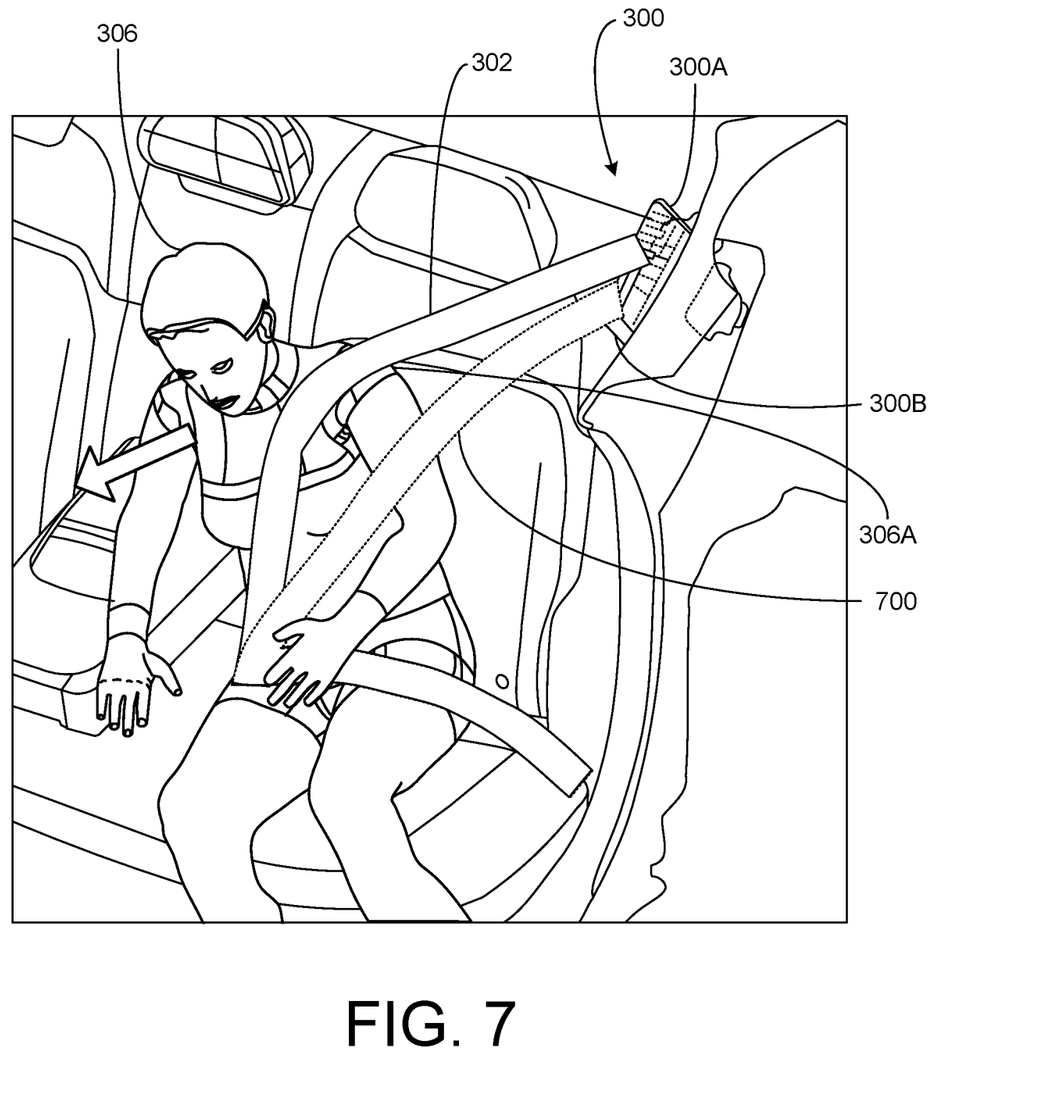
FIG. 7 shows an example of the dynamic guide providing an upper anchorage for a vehicle seatbelt, pictured in a lateral/oblique impact condition.

FIG. 7 shows an example of the dynamic guide 300 providing an upper anchorage for a vehicle seatbelt, pictured in a lateral/oblique impact condition. Here, the dynamic guide 300 has been actuated so that the lid 300A is at least partially separated from the base 300B. The dynamic guidance here ensures that the webbing 302 remains on the shoulder 306A, and does not assume a position 700 (shown in phantom) of falling off the shoulder.

Figure 8:
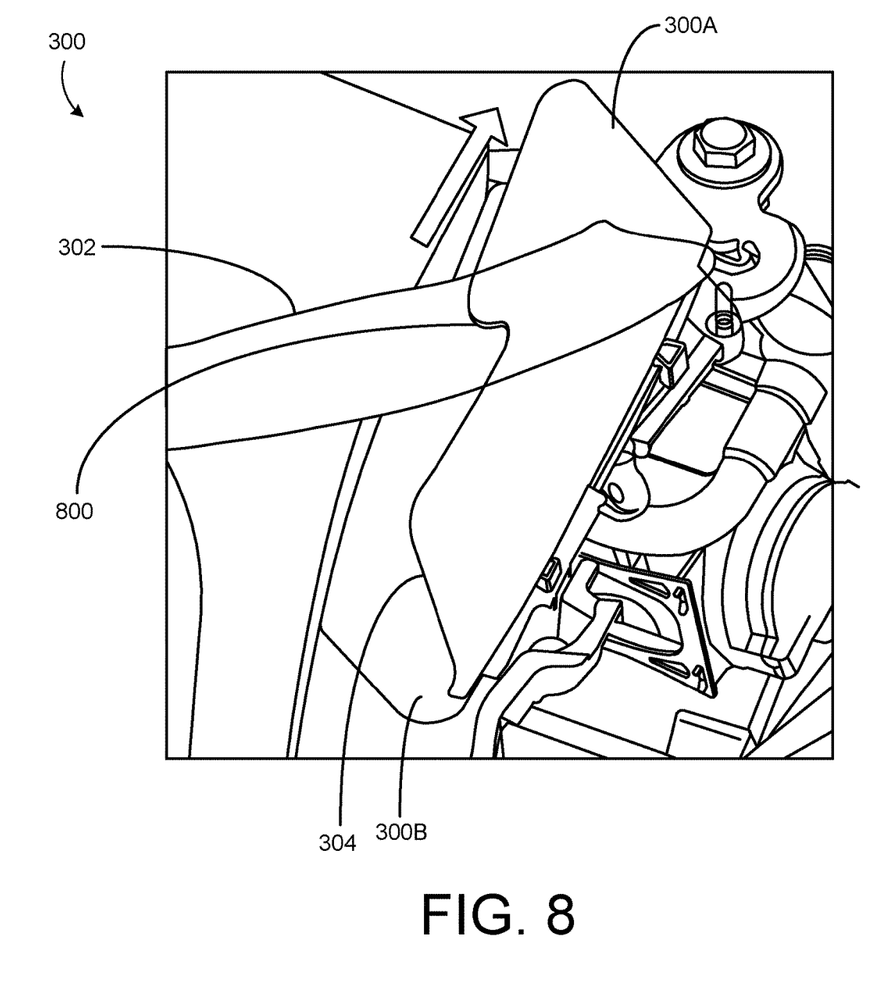
FIG. 8 shows an example of the dynamic guide of FIG. 7.

FIG. 8 shows an example of the dynamic guide 300 of FIG. 7. The dynamic guide 300 has been actuated so that the lid 300A is at least partially separated from the base 300B. The webbing 302 can exit the dynamic guide 300 at a location 800, different from the opening 304.

Figure 9:
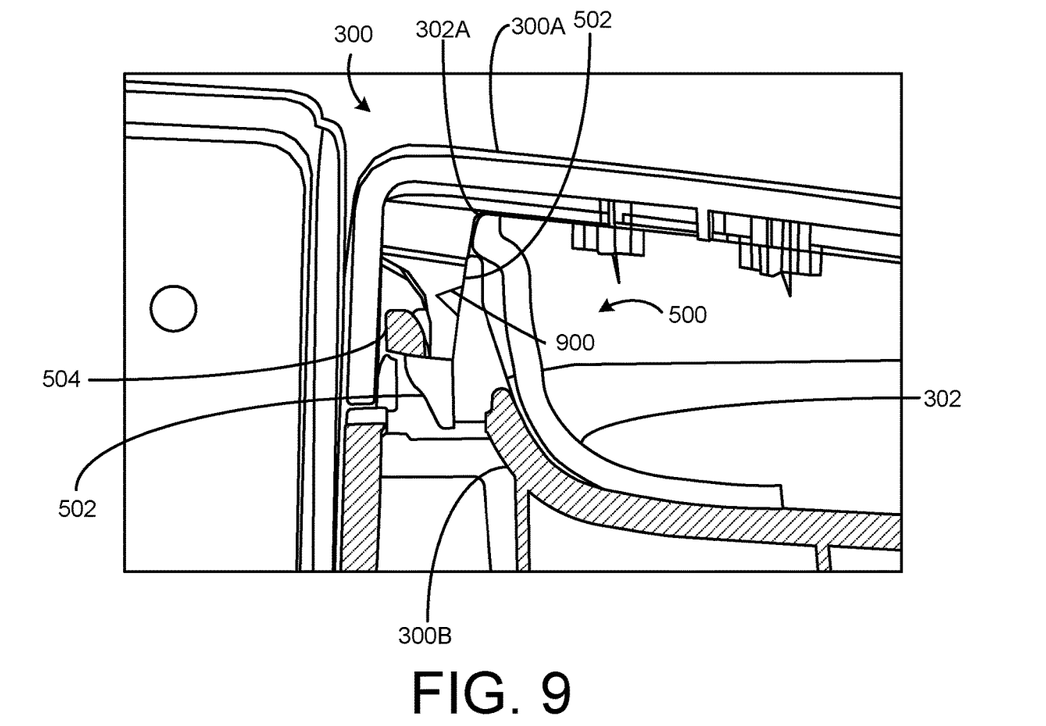
FIG. 9 shows an example of a cross section of the dynamic guide in FIG. 5, wherein the dynamic guide has an initiator at the snap feature.

FIG. 9 shows an example of a cross section of the dynamic guide 300 in FIG. 5, wherein the dynamic guide 300 has an initiator 900 at the snap feature 500. The dynamic guide 300 can also or instead have an initiator or another disengagement mechanism at the snap feature 600 (FIG. 6). Here, a disengagement mechanism of the snap feature 500 includes the initiator 900 formed in the hook 502. In some implementations, the initiator 900 can be an intentionally created weakening in the material, including but not limited to, a notch in the hook 502. The disengagement mechanism is configured for releasing the lid 300A from the base 300B at a predetermined tension in the webbing 302. For example, the tension in the webbing 302 can cause an edge 302A of the webbing 302 to apply force to the inside of the lid 300A. The force can cause the hook 502 to rupture and therefore no longer engage with the detent 504.

Figure 10:
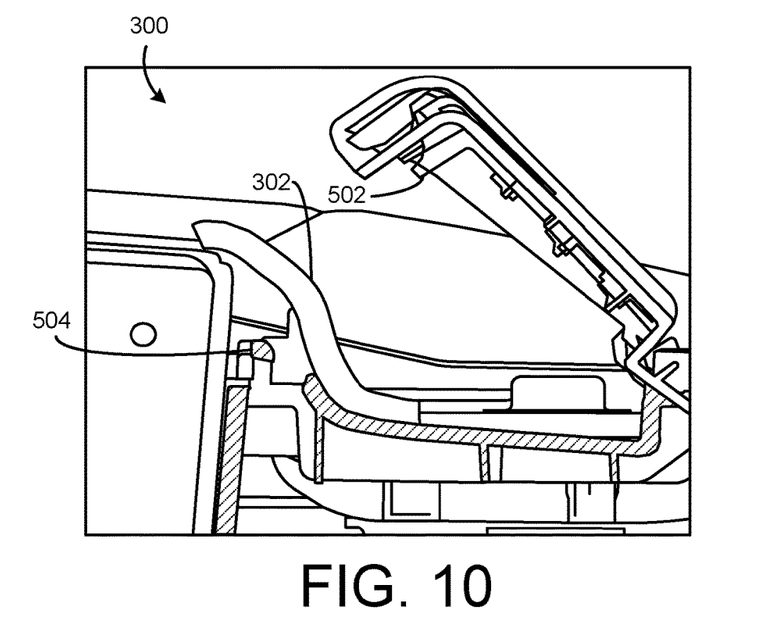
FIG. 10 shows an example of a cross section of the dynamic guide in FIG. 9, wherein the initiator has ruptured the snap feature.

FIG. 10 shows an example of a cross section of the dynamic guide in FIG. 9, wherein the initiator 900 has ruptured the snap feature 500. The lid 300A has at least partially separated from the base 300B. As such, the hook 502 no longer engages with the detent 504, and the webbing 302 is no longer confined inside the dynamic guide 300. Accordingly, the dynamic guide 300 can dynamically guide the webbing 302.

Figure 11:
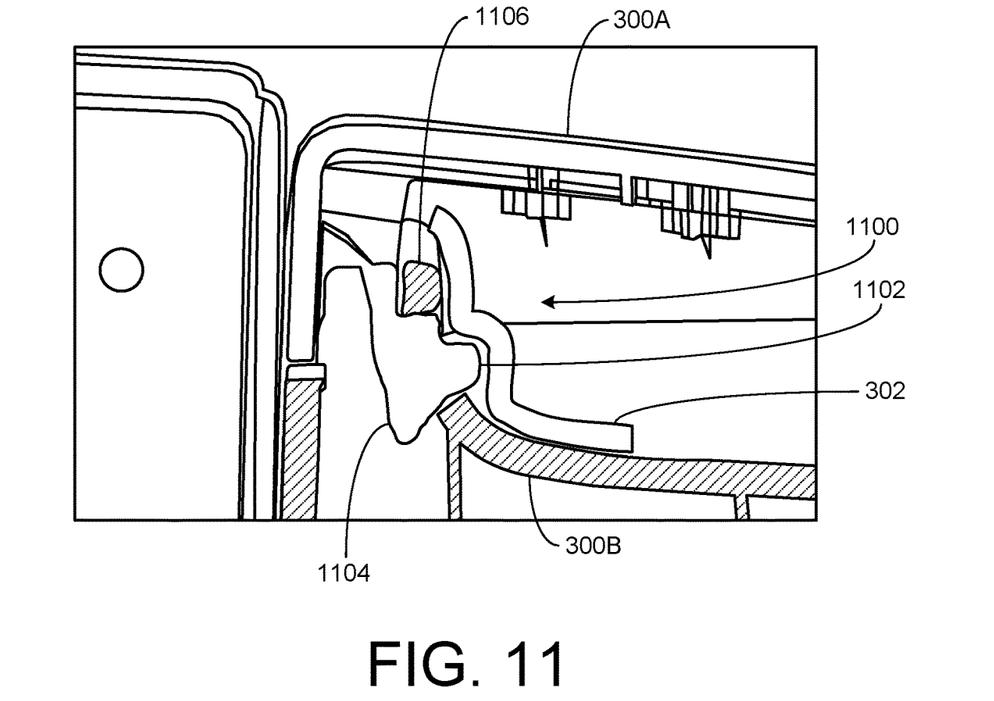
FIG. 11 shows an example of a cross section of the dynamic guide in FIG. 5, wherein the dynamic guide has a disengagement mechanism at the snap feature.

FIG. 11 shows an example of a cross section of the dynamic guide 300 in FIG. 5, wherein the dynamic guide has a disengagement mechanism 1100 at the snap feature 500. The dynamic guide 300 can also or instead have the disengagement mechanism 1100 or another disengagement mechanism at the snap feature 600 (FIG. 6). Here, the disengagement mechanism 1100 includes a release 1102 extending from a hook 1104. The hook 1104 can engage with a detent 1106. In some implementations, the release 1102 can extend away from the hook 1104 in substantially the same direction as the hook 1104 is biased toward the detent 1106. The release 1102 is configured for releasing the lid 300A from the base 300B at a predetermined tension in the webbing 302. For example, the tension in the webbing 302 can cause the webbing 302 to apply force to the release 1102, thereby moving the hook 1104 in a direction opposite to its bias direction. The force can cause the hook 1104 to disengage from the detent 1106.

Figure 12:
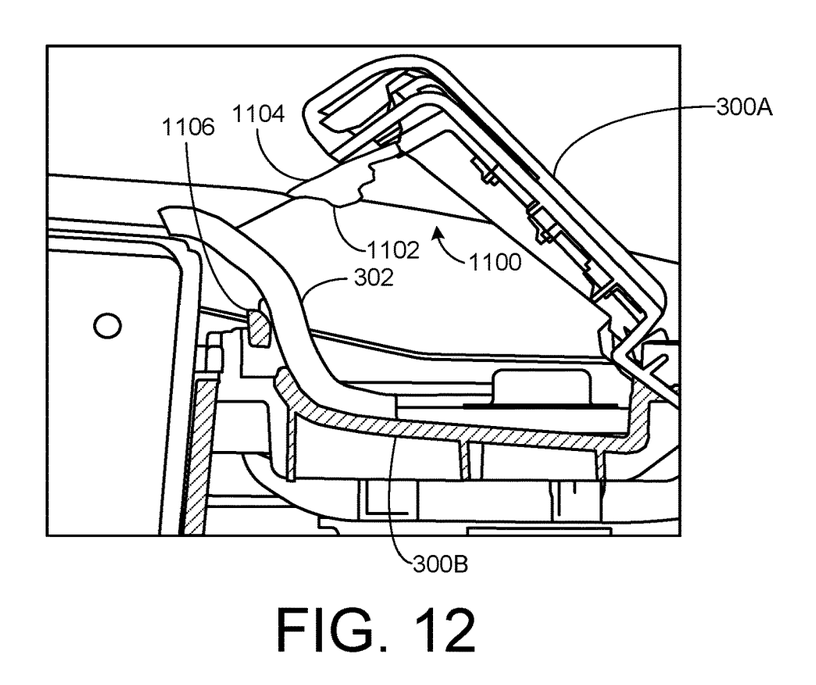
FIG. 12 shows an example of a cross section of the dynamic guide in FIG. 8, wherein the disengagement mechanism has disengaged the snap feature.

FIG. 12 shows an example of a cross section of the dynamic guide in FIG. 11, wherein the disengagement mechanism 1100 has disengaged the snap feature. Here, the webbing 302 applied pressure on the release 1102 due to the tension, and the pressure caused the hook 1104 to disengage from the detent 1106, thereby allowing the lid 300A to at least partially separate from the base 300B.

Figure 13:
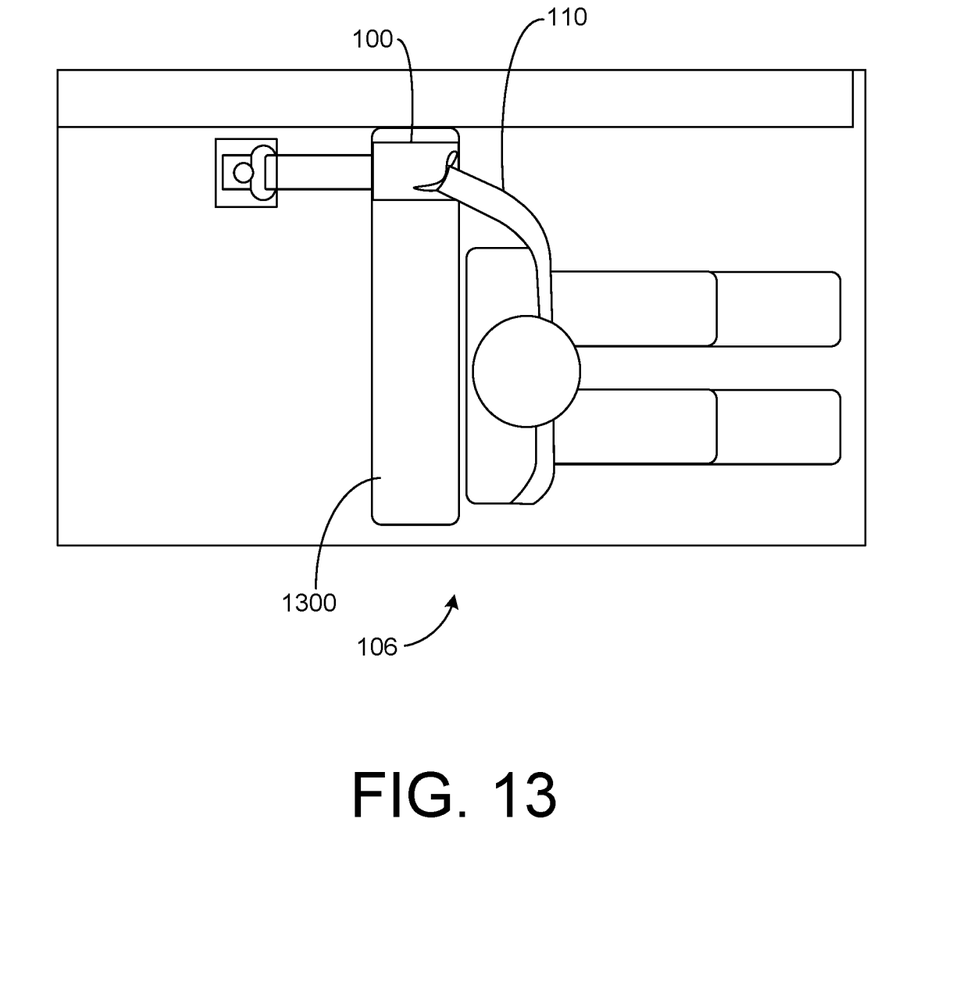
FIG. 13 shows an example of the dynamic guide of FIGS. 1A-1B, positioned on the seatback.

FIG. 13 shows an example of the dynamic guide 100 of FIGS. 1A-1B, positioned on the seatback. Some aspects of this example are similar or identical to those of the examples in FIGS. 1A-1B and will not be repeated here. The seat 106 has a seatback 1300 and the dynamic guide 100 is positioned on the seatback 1300. This example is pictured in a comfort condition, or a condition of frontal impact, where the dynamic guide 100 has not been actuated. If a predetermined tension occurs in the seatbelt webbing 110 (e.g., less than a load limit tension but more than an occupant movement tension) the dynamic guide 100 can become actuated and dynamically guide the seatbelt webbing during the collision.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A seatbelt system for an occupant of a vehicle, the seatbelt system comprising:
   an anchor point attached to a body of the vehicle;
   seatbelt webbing extending from the anchor point toward the occupant;
   a dynamic guide for the seatbelt webbing positioned between the anchor point and a shoulder of the occupant, the dynamic guide comprising a lid attached to a base, the seatbelt webbing extending through the dynamic guide and exiting through an opening between the lid and the base, the dynamic guide configured so that the lid at least partially separates from the base at a first predetermined tension in the seatbelt webbing laterally in the vehicle; and
   a seatbelt retractor attached to the body of the vehicle, wherein the seatbelt webbing is attached to the seatbelt retractor, wherein the anchor point is positioned between the seatbelt retractor and the dynamic guide, and wherein the first predetermined tension is lower than a second predetermined tension corresponding to a load limit tension of the seatbelt retractor.

2. The seatbelt system of claim 1, wherein the seatbelt webbing is fixed to the body of the vehicle at the anchor point.

3. The seatbelt system of claim 1, wherein the anchor point is substantially horizontally level with the dynamic guide or higher than the dynamic guide.

4. The seatbelt system of claim 1, wherein the first predetermined tension is higher than a third predetermined tension corresponding to occupant movement.

5. The seatbelt system of claim 1, wherein the dynamic guide is attached to an interior wall of a passenger compartment of the vehicle.

6. The seatbelt system of claim 1, wherein the dynamic guide is attached to a seatback of a seat of the occupant.

7. The seatbelt system of claim 1, wherein the seatbelt system is installed for a second-row seat, or a subsequent-row seat, of the vehicle.

8. The seatbelt system of claim 1, wherein the dynamic guide has a snap feature holding the lid and the base together in a closed position, the snap feature comprising a hook on one of the lid or the base, the hook configured for engaging with a detent on the other of the lid or the base.

9. The seatbelt system of claim 1, wherein the dynamic guide has a disengagement mechanism for releasing the lid from the base at the first predetermined tension in the seatbelt webbing.

10. A seatbelt system for an occupant of a vehicle, the seatbelt system comprising:
    an anchor point attached to a body of the vehicle;
    seatbelt webbing extending from the anchor point toward the occupant; and
    a dynamic guide for the seatbelt webbing positioned between the anchor point and a shoulder of the occupant, the dynamic guide comprising a lid attached to a base, the seatbelt webbing extending through the dynamic guide and exiting through an opening between the lid and the base, the dynamic guide configured so that the lid at least partially separates from the base at a first predetermined tension in the seatbelt webbing laterally in the vehicle, wherein the dynamic guide has a disengagement mechanism for releasing the lid from the base at the first predetermined tension in the seatbelt webbing, and wherein the disengagement mechanism is configured to rupture at the first predetermined tension in the seatbelt webbing.

11. The seatbelt system of claim 10, wherein the disengagement mechanism comprises an initiator to cause the disengagement mechanism to rupture at the first predetermined tension.

12. The seatbelt system of claim 11, wherein the dynamic guide has a snap feature holding the lid and the base together in a closed position, the snap feature comprising a hook on one of the lid or the base, the hook configured for engaging with a detent on the other of the lid or the base, and wherein the initiator comprises a notch in the hook.

13. The seatbelt system of claim 9, wherein the dynamic guide has a first snap feature holding the lid and the base together in a closed position, the first snap feature comprising a hook on one of the lid or the base and a detent on the other of the lid or the base, and wherein the disengagement mechanism is configured to disengage the hook from the detent at the first predetermined tension in the seatbelt webbing.

14. The seatbelt system of claim 13, wherein the disengagement mechanism comprises a release extending from the hook, the release configured so that tension in the seatbelt webbing causes the seatbelt webbing to apply pressure on the release.

15. The seatbelt system of claim 13, further comprising a second snap feature holding the lid and the base together in the closed position, the first and second snap features positioned between the anchor point and the opening through which the seatbelt webbing exits.

* * * * *